United States Patent [19]

Watts

[11] Patent Number: 5,313,410

[45] Date of Patent: May 17, 1994

[54] ARTIFACT AND METHOD FOR VERIFYING ACCURACY OF A POSITIONING APPARATUS

[75] Inventor: William A. Watts, Colchester, Conn.

[73] Assignee: Alpha Q, Inc., Colchester, Conn.

[21] Appl. No.: 677,640

[22] Filed: Mar. 28, 1991

[51] Int. Cl.5 ............................ G01B 5/03; G01B 5/00
[52] U.S. Cl. .................... 364/571.01; 33/503; 33/545; 73/1 J; 364/551.02; 364/561
[58] Field of Search .............. 364/571.01, 559, 560, 364/561, 551.02, 474.02, 474.03, 474.04, 474.05, 474.37; 73/1 J; 33/502, 503, 504, 505, 644, 645, 545, 555.2, 567, 565, 556, 562

[56] References Cited

U.S. PATENT DOCUMENTS

| | | | |
|---|---|---|---|
| 4,364,182 | 12/1982 | Jones | 33/567 |
| 4,373,267 | 2/1983 | Lycan | 33/502 |
| 4,437,151 | 3/1984 | Hurt et al. | 364/571.02 |
| 4,492,036 | 1/1985 | Beckwith | 33/613 |
| 4,523,450 | 1/1985 | Herzog | 73/1 J |
| 4,777,818 | 10/1988 | McMurty | 73/1 R |
| 4,884,348 | 12/1989 | Zeller et al. | 33/502 |
| 4,962,591 | 10/1990 | Zeller et al. | 33/502 |
| 4,986,003 | 1/1991 | DoCarmo | 33/502 |
| 5,181,809 | 1/1993 | Martin | 33/503 X |

Primary Examiner—Jack B. Harvey
Assistant Examiner—Edward J. Pipala
Attorney, Agent, or Firm—Hayes & Reinsmith

[57] ABSTRACT

A gage master artifact and method for verifying calibration of machine tools and other positioning apparatus such as a coordinate measuring machine wherein measurements are taken of bore sizes and lengths of the artifact in different orientations within the coordinate field of the apparatus by a probe of that apparatus and comparing such measurements with known measurements of the artifact to verify calibration accuracy of the apparatus.

3 Claims, 4 Drawing Sheets

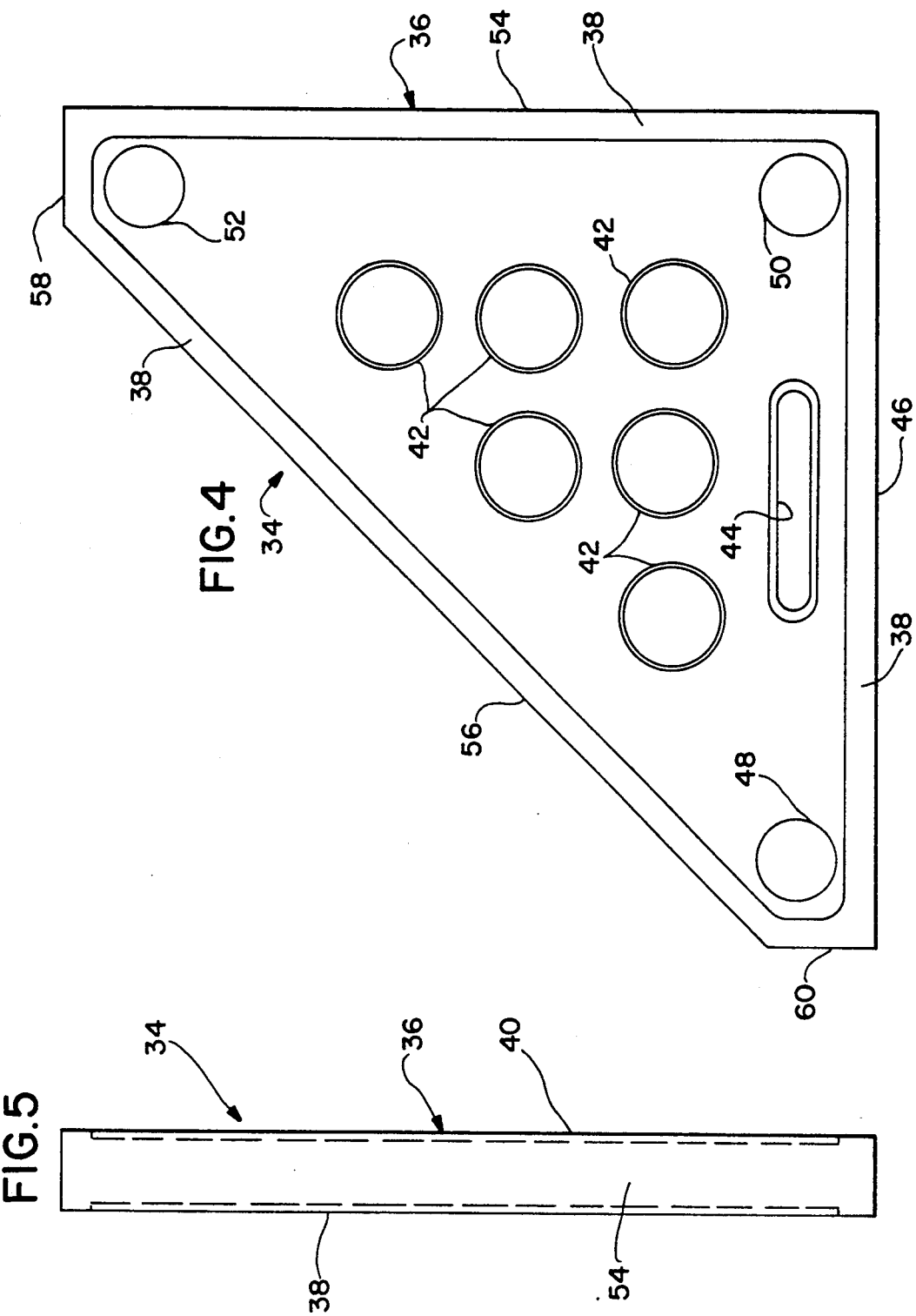

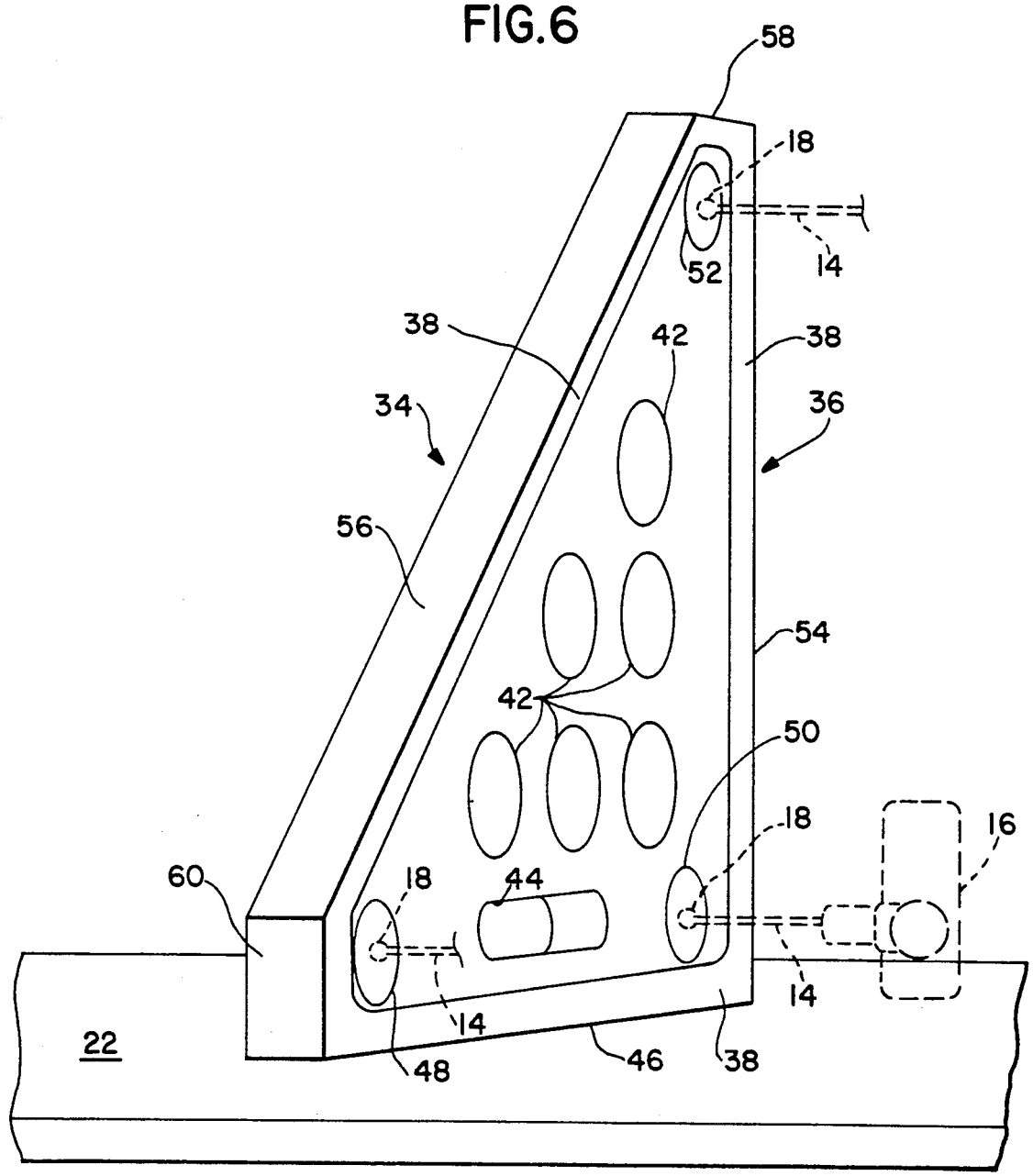

ARTIFACT AND METHOD FOR VERIFYING ACCURACY OF A POSITIONING APPARATUS

BACKGROUND OF THE INVENTION

State of the art manufacturing demands that accuracy be manufactured into product. The accuracy of machine tools for manufacturing a variety of different types of parts, such as milling machines, lathes and other positioning apparatus having a touch probe generally all have a reference plane from which measurements are made as to relative movements of the machine and part.

A coordinate measuring machine (CMM) is such a positioning apparatus which provides accurate determination of spatial relationships among points in space and is particularly useful in measurement of product to determine whether a manufactured product should be accepted or rejected. It is accordingly imperative from a quality control standpoint to periodically determine whether a CMM or similar machine has the necessary accuracy to measure such product.

To ensure that the desired accuracy is indeed manufactured into the product, such machines should be routinely checked on a periodic basis to reduce waste and manufacturing downtime and to ensure improved product quality. However, the time required to conduct such inspections and the laborious process involved in the use of many of the available conventional techniques frequently results in calibration verification being neglected by an operator. Such neglect may well result in serious losses if product is being audited by a CMM or similar positioning apparatus having unacceptable inaccuracies.

OBJECTS OF THE INVENTION

An object of this invention is to provide a new and improved gage master artifact of simplified construction which not only will accurately verify calibration of a positioning apparatus but is particularly designed to provide a quick inspection requiring minimum skills with an artifact that is so easy to use in practice that it will serve as an inducement for verification of machine calibration to be readily undertaken on a periodic basis rather than avoided as an unwelcome chore.

Another object of this invention is to provide such a new and improved artifact which is relatively easy and economical to manufacture to precision standards for use as a convenient means for verification of the accuracy and repeatability of manual or fully programmable machine tools and of CMM systems as well as to correlate the accuracy of manufacturing and inspection equipment.

Yet another object of this invention is to provide a new and improved method of verifying calibration of a positioning apparatus utilizing a gage master artifact of the type described having a known configuration which is readily manually manipulated to provide quick and easy verification of calibration of a machine tool or CMM for accuracy and repeatability.

Yet a further object of the invention is to provide such a new and improved method for inspection cost savings, improved accuracy achieved through increased inspections requiring minimum time input and off-line time requirements and which may be accomplished without requiring high operator skill.

Other objects will be in part obvious and in part pointed out more in detail hereinafter.

SUMMARY OF THE INVENTION

A gage master artifact of this invention comprises a plate having an array of probe contact apertures defining a corresponding pattern of preselected points with each aperture having a peripheral profile engageable with a probe of a positioning apparatus for comparing its measurements with the known configuration of the artifact for verifying the integrity of the positioning apparatus calibration.

The method of this invention verifies calibration of a positioning apparatus by positioning an artifact on a surface of the apparatus in a selected orientation and then using a probe to determine distance measurements between preselected points defined by the artifact, feeding the probe measurements into a computer interfaced with the apparatus, and determining any deviation between the probe measurement values based on calibration data for the selected orientation of the probe and pre-established standard dimensional values of the artifact.

A better understanding of this invention will be obtained from the following detailed description and the accompanying drawings of an illustrative application of this invention.

BRIEF DESCRIPTION OF THE DRAWINGS

In the drawings:

FIG. 4 is a side view of an artifact of this invention;

FIG. 5 is an end view of the artifact; and

FIG. 6 is a perspective view of the artifact supported on a surface of a positioning apparatus with a probe of that apparatus illustrated in broken lines.

DETAILED DESCRIPTION OF A PREFERRED EMBODIMENT

Figure 1:
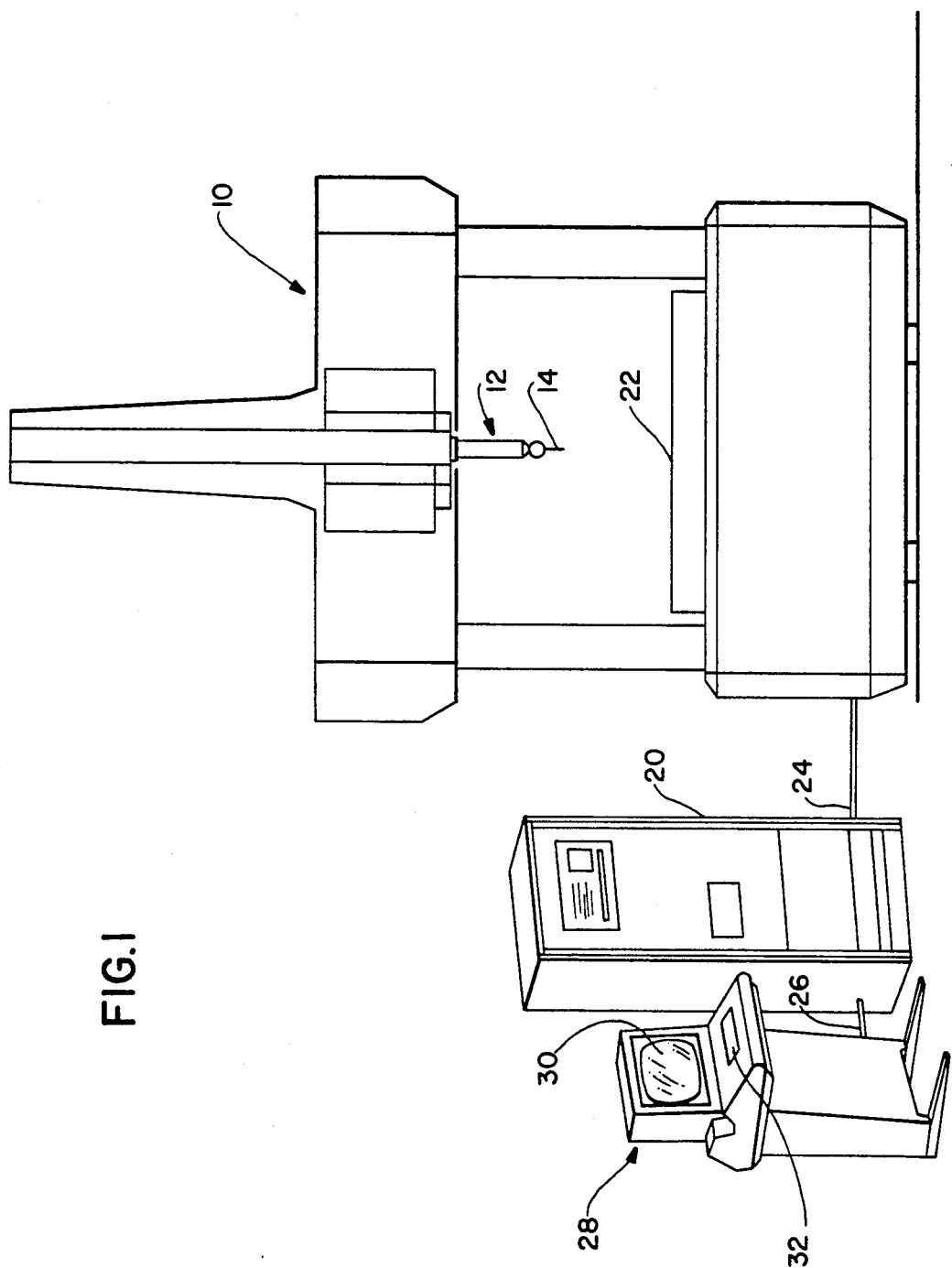
FIG. 1 is a front elevational view, partly in perspective, showing a computerized CMM system with which this invention can be used.
Figure 2:
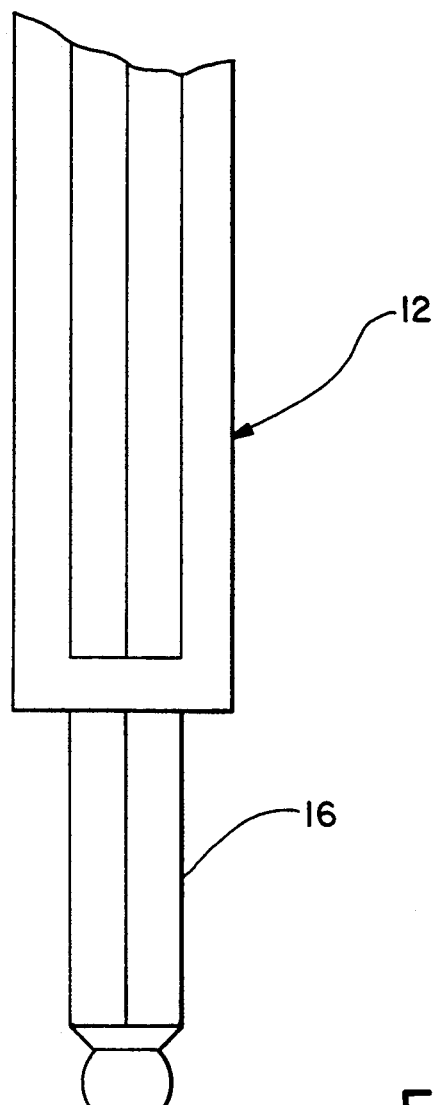
FIG. 2 is an enlarged side elevational view, partly broken away, of a probe of the CMM of FIG. 1.

In FIG. 1 a commercially available CMM 10 is depicted equipped with a suitable head 12 with probe 14 and which will be understood to be of a manual type or a fully programmable direct computer controlled type so as to effect probe movement without operator assistance. Probe 14 comprises a housing 16 secured to head 12 and having a spherical sensing element 18. Probe 14 is provided to enter measured values into a data processor or computer 20 of CMM 10. The CMM 10 includes a support surface or table 22 upon which a machine part may be placed for inspection by an operator who then moves the probe of the CMM into contact with various points of the part. Upon such contact, the probe causes the CMM to provide a plurality of coordinate data points or three dimensional orthogonal coordinate signals representative of a location of the point contacted by the probe. A cable 24 is shown connecting the CMM to computer 20 known in the art and which has a memory and is capable of being programmed to manipulate various inputted signals and which can store, retrieve and process data. Computer 20 is connected by cable 26 to a conventional computer read-out/in terminal 28 of any type capable of inputting and outputting information into a computer. Terminal 28 includes a video screen 30 and keyboard 32 and is capable of inputting both the program as well as basic input data through keyboard 32 and providing a readout of computer data on screen 30.

While this invention concerns a gage master artifact 34 described in connection with a CMM which will be understood to be normally maintained and used in a temperature controlled environment, it is to be recognized that the artifact 34 of this invention is equally applicable for use with milling machines, lathes, or other machine tools on a machine shop floor. Such tools are capable of manufacturing a variety of different types of parts, and machine checking is particularly useful to reduce waste and increase product quality.

In all of these types of machines, generally referred to herein as positioning apparatus, a wide variety of machine tools are encompassed, each of which have a reference plane from which measurements are taken responsive to workpiece contact by a touch probe with the machine and part moving relative to one another in accordance with movements dictated by a computer interfaced with the machine. In short, the control system of the machine may be operated by a program stored in a computer to move the head to any given position within the range of the machine. It also will be understood that the computer is able to calculate the position of the centers of apertures or openings in accordance with a pre-entered program taking into account the size of the openings and the geometry and positioning of those openings in relation to one another to determine linear distances between specific centers of the openings.

Turning now specifically to the gage master artifact 34 of this invention, artifact 34 is a geometrical instrument particularly designed to verify calibration of a positioning apparatus such as described above. I.e., the positioning apparatus has a work-contacting touch probe and computer programmed calibration data, established for different probe orientations, which allows for a comparison of probe measurements of the positioning apparatus based on its calibration data with a known configuration of the artifact 34 for verifying the integrity of the positioning apparatus calibration. The apparatus is programmed for the different probes available, and the size of the spherical sensing element is known for precisely locating the major axis of the probe.

In the specifically illustrated embodiment, artifact 34 is illustrated as a generally triangular flat rigid plate 36 which may be formed, for example, of 440c stainless steel hardened to 62 Rockwell C scale, stress relieved and triple stabilized, with faces 38, 40 (FIG. 5) of the plate ground and lapped flat and parallel within 50 microinches (0.000050 inches). While such a construction has been found to work satisfactorily, were the artifact to be used to check the accuracy of a positioning apparatus being used for the manufacture of ceramic parts, for example, the artifact itself might be formed of ceramic to provide that rigid flat plate. Accordingly, the material from which the artifact is formed is not critical.

To minimize the weight of artifact 34, a plurality of openings of any suitable configuration such as at 42 are shown formed in the interior of plate 36 and a slot is shown at 44 having a major axis extending parallel to an outer peripheral reference surface 46 of plate 36. Slot 44 may, if desired, be used in clamping artifact 34 to table 22 when the artifact is in use.

In accordance with one feature of this invention, a plurality of probe contact apertures, namely, three circular openings at 48, 50, and 52 are shown in the specifically illustrated embodiment formed adjacent corners of the triangular plate 36 and which are contained in a common plane within the confines of plate 36. While illustrated as extending through plate 36, this invention contemplates apertures formed as cavities which extend only partly through plate 36. Line projections between aperture centers form a right angle at the center of aperture 50 adjacent the intersection of the reference surface 46 and a second peripheral surface 54 shown extending at a right angle away from reference surface 46. A third peripheral surface 56 extends at an angle of 45° to both the reference surface 46 and the second peripheral surface 54 and forms a hypotenuse of the triangular plate. Connecting surfaces 58 and 60 are shown extending normal to and joining surfaces 54 and 46 with third peripheral surface 56.

In the specifically illustrated embodiment, the described probe contact apertures 48, 50, and 52 have been found to be satisfactorily provided by one inch diameter bores, certified to +/−10 microinches (0.000010 inches) in roundness which openings are on eight (8.0000) inch centers between bores 48, 50 and 50, 52; and on 11.3137 inch centers between bores 48, 52. These lengths between aperture centers are calibrated with a measurement uncertainty of +/−20 microinches (0.000020 inches), and the squareness of faces of the outside peripheral surfaces 46 and 54 are checked to +/−10 microinches (0.000010 inches) with each edge surface in parallel relation to a line containing the centers of apertures 48, 50 and 50, 52.

In the actual process of manufacture of plate 36, reference surface 46 which may serve as the X axis edge face, is normally ground first and the apertures 48, 50, 52 are bored, followed by the grinding of the second peripheral surface 54 which may serve as a Y-axis outside edge face. By providing quality grinding in this regard on a plate 36 having a nominal eight inch linear dimension between centers of the apertures 48 and 50 (adjacent surface 46) and 50 and 52 (adjacent surface 54), a deviation of, say, 20 microinches between each of the apertures results in an angular error of about only 0.4 seconds of a degree from an absolute right angle. Knowing what the pattern of the apertures 48, 50, 52 is (from a certificate which may be conveniently provided with the artifact), an operator can determine actual deviation of the surfaces 46, 54 of the artifact 34 from an absolutely square 90° angle.

In the manufacture of the artifact, the above noted linear distances and diameters are established by a master standard gage block calibrated directly by the National Institute of Standards and Technology and any deviation in that master standard gage block is zeroed into a measuring machine such as a commercially available Federal 136B3 comparator at a given reference temperature in accordance with well known testing/calibration standards. The nominal dimensions established by the master standard gage block are thereafter compared to the actual dimensional measurements of the artifact itself for purposes of certification as to its calibrated accuracies.

In short, calibrated accuracies are preferably certified to (a) provide a diameter round within 10 microinches, (b) three lengths calibrated with a measurement uncertainty of 20 microinches and (c) an angular uncertainty of less than 1 second in an artifact lapped flat and parallel within 10 microinches. When such an artifact is used for verifying calibration of a machine, any differences outside of the machine manufacturer's specifications or from previous inspections then should alert an operator that there is a problem. For example, when used to verify the accuracy of a typical commercially available CMM, a potential problem will be identified by the artifact 34 of this invention when the coordinate data points generated by the CMM deviate from the known artifact dimensions more than the machine manufacturer's stated tolerances.

In use, it will be seen that the artifact 34 of this invention has the capability of producing four major checks with regard to diameter, linear length, squareness, and volumetric accuracy. In checking a CMM, the artifact 34 is first laid flat down on its face 40 onto table 22 and an X axis is trammed in with probe 14 of the positioning apparatus 10 by moving that probe 14 along the outside reference surface 46. Then aperture 48 is checked for its diameter and is preferably measured by probe 14 left to right as viewed in the drawing. Probe 14 is then moved along the X axis and aperture 50 is checked for its diameter, preferably first moving probe 14 left to right and then from top to bottom. By movement of the probe 14 from apertures 48 to 50, a linear measurement between aperture centers is derived through a simple program of computer 20 interfaced with CMM 10 which readily provides a read-out as to the length along the X axis between centers of the respective apertures 48 and 50 and establishes their location. The probe 14 is then moved up along the Y axis between apertures 50 and 52 and thereafter the remaining aperture 52 is measured, preferably top to bottom, for diameter and to determine the length between centers of apertures 50 and 52. With the angle calibrated on artifact 34 as described above, an operator also then has a squareness check of the X and Y axes of the CMM. Finally, upon movement of probe 14 between apertures 52 and 48 parallel to the hypotenuse surface 56, a volumetric check across the X and Y axes is effected upon determination of the linear distance between centers of apertures 52 and 48, it being understood that such volumetric measurements are determined by the CMM computer 20 with standard mathematical logarithms, root mean square techniques etc. which are programmed into computer 20 to figure the volume.

Figure 3:
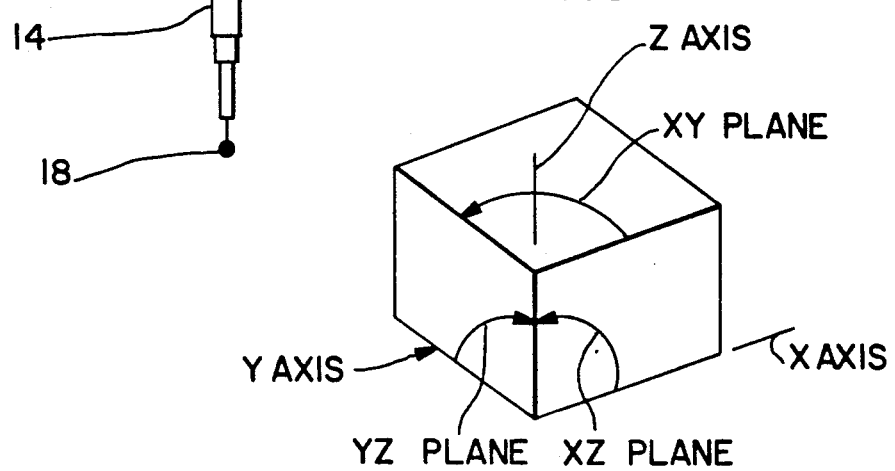
FIG. 3 is a simplified schematic view illustrating certain coordinate axes and planes which are used in connection with this invention.

Then, by standing the artifact 34 up on end with the precisely ground reference surface 46 engaging the table 22 (FIG. 6), the same procedure and sequence of steps are repeated to check the X axis to the Z axis and/or the Y axis to the Z axis (see FIG. 3).

Finally, upon placing the upright artifact 34 at an approximate 45° angle across the X and Y axes and measuring the linear distance (between centers of apertures 52 and 48) of the hypotenuse, a true volumetric check across all three axes is achieved in the same fashion the CMM 10 makes its routine inspections.

As described, the highest standards are used in calibrating the artifact with a master standard gage block directly traceable to the National Institute of Standards and Technology to provide a precision device which is calibrated independently of any positioning apparatus the accuracy of which is being verified.

As will be apparent to persons skilled in the art, various modifications, adaptations and variations of the foregoing specific disclosure can be made without departing from the teachings of this invention.

I claim:

1. For use in verifying calibration of a positioning apparatus having a work-contacting touch probe and computer programmed calibration data established for different probe orientations, a gage master artifact comprising a flat rigid plate having a generally triangular peripheral configuration, and an array of probe contact apertures formed in the plate with each of the probe contact apertures being formed adjacent a corner of the plate, the probe contact apertures comprising three circular openings formed to extend through the plate and defining a corresponding pattern of preselected points spaced apart from one another at precisely predetermined linear distances establishing standard dimensional values wherein line projections between such points form a right angle at one of said preselected points, the probe contact apertures each having a circular wall defining a peripheral profile engageable with a probe of a positioning apparatus for comparing its measurements with the known configuration of the artifact for verifying the integrity of the positioning apparatus calibration.

2. The artifact of claim 1 wherein the plate has outer peripheral surfaces including a precisely ground reference surface and a second peripheral surface arranged at a right angle thereto to extend in a normal direction away from the reference surface.

3. The artifact of claim 2 further including a third peripheral surface extending at an angle of 45° to both the reference surface and said second peripheral surface.

* * * * *